US010481755B1

(12) United States Patent
Ngo et al.

(10) Patent No.: US 10,481,755 B1
(45) Date of Patent: Nov. 19, 2019

(54) SYSTEMS AND METHODS TO PRESENT VIRTUAL CONTENT IN AN INTERACTIVE SPACE

(71) Applicant: Meta View, Inc., San Mateo, CA (US)

(72) Inventors: Kevin Ngo, Sunnyvale, CA (US); Saranyan Vigraham, Sunnyvale, CA (US)

(73) Assignee: Meta View, Inc., San Mateo, CA (US)

( * ) Notice: Subject to any disclaimer, the term of this patent is extended or adjusted under 35 U.S.C. 154(b) by 250 days.

(21) Appl. No.: 15/582,419

(22) Filed: Apr. 28, 2017

(51) Int. Cl.
*G06F 3/0481* (2013.01)
*G06T 15/50* (2011.01)
*G06F 3/01* (2006.01)
*G06T 19/20* (2011.01)

(52) U.S. Cl.
CPC .......... *G06F 3/04815* (2013.01); *G06F 3/017* (2013.01); *G06T 15/50* (2013.01); *G06T 19/20* (2013.01); *G06T 2219/2004* (2013.01); *G06T 2219/2012* (2013.01); *G06T 2219/2016* (2013.01)

(58) Field of Classification Search
CPC ..... G06F 3/04815; G06F 3/017; G06T 19/20; G06T 2219/2004; G06T 2219/2012; G06T 2219/2016
See application file for complete search history.

(56) References Cited

U.S. PATENT DOCUMENTS

| | | | | |
|---|---|---|---|---|
| 8,334,867 | B1 * | 12/2012 | Davidson | G06F 3/04815 345/419 |
| 9,606,584 | B1 * | 3/2017 | Fram | G06F 1/1694 |
| 2011/0107270 | A1 * | 5/2011 | Wang | G06F 19/3481 715/850 |
| 2013/0342570 | A1 * | 12/2013 | Kinnebrew | G09G 3/003 345/633 |
| 2014/0184496 | A1 * | 7/2014 | Gribetz | G02B 27/017 345/156 |
| 2014/0361988 | A1 * | 12/2014 | Katz | G06F 3/011 345/156 |
| 2017/0235143 | A1 | 8/2017 | Chi | |

* cited by examiner

*Primary Examiner* — Tadesse Hailu

(57) ABSTRACT

A system configured to present virtual content in an interactive space may comprise one or more of a light source, an optical element, one or more physical processors, non-transitory electronic storage, and/or other components. The light source may be configured to emit light. The optical element being configured to provide the light emitted from the light source to an eye of the user. The non-transitory electronic storage may be configured to store virtual content information defining virtual content. The virtual content may include one or more of a virtual presentation area, one or more virtual tools, one or more virtual object, and/or other virtual content. The virtual presentation area may be provided for generating and/or displaying presentations of virtual content. The presentation may include a set of scenes. An individual scene may include one or more virtual objects posed on the virtual presentation area.

18 Claims, 11 Drawing Sheets

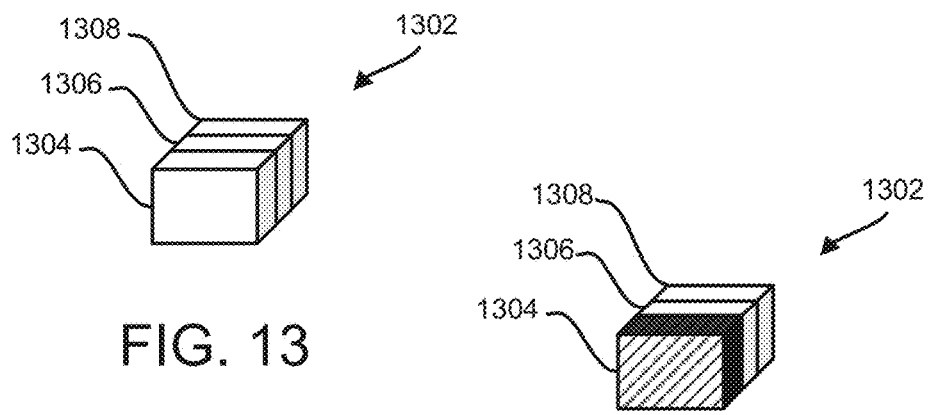
FIG. 13
FIG. 14
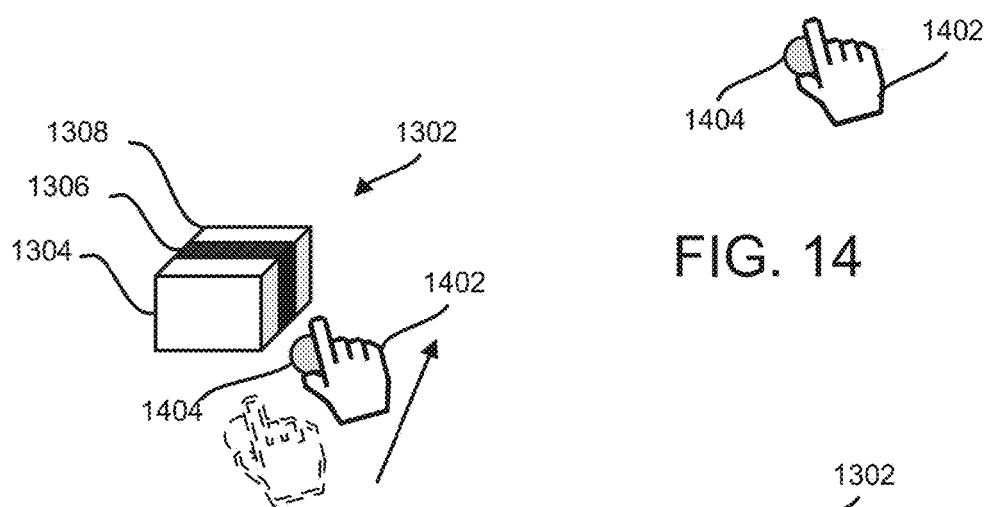
FIG. 15
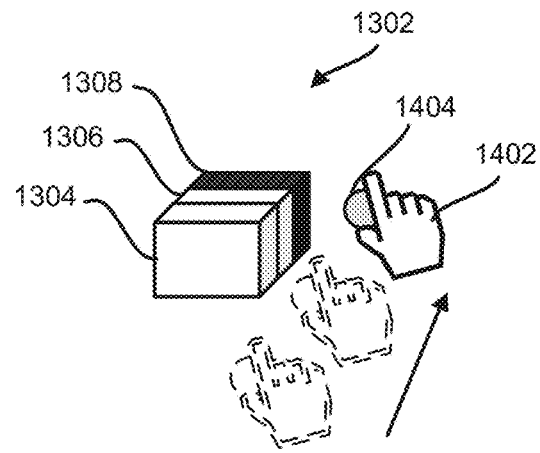
FIG. 16

SYSTEMS AND METHODS TO PRESENT VIRTUAL CONTENT IN AN INTERACTIVE SPACE

FIELD OF THE INVENTION

The system and methods described herein relate to presenting virtual content in an interactive space.

BACKGROUND OF THE INVENTION

Interactive spaces, including augmented reality environments and/or virtual reality environments, may be used to present virtual content to users.

SUMMARY

The systems and methods described herein facilitate presenting virtual content (e.g., virtual objects in the form of three dimensional digital imagery) in an interactive space. A virtual presentation area may be provided for generating and/or presenting presentations of virtual content. A presentation may include a set of scenes or "slides." The terms "scene" and "slide" may be used interchangeably herein. Individual scenes or slides may depict virtual content. An individual scene or slide may include one or more virtual objects posed on the virtual presentation area. A pose of a virtual object may include one or more of an aspect ratio, a zoom, a position, an orientation, and/or other arrangement of the virtual object.

A presentation generated using the virtual presentation area may be viewed by multiple users of the interactive space. One or more users generating the presentation (herein referred individually as a "presenting user") may specify one or more permissions associated with one or more users viewing the presentation (herein referred individual as a "participating user"). Permissions may related to one or more parameters of virtual objects that may be controllable by individual participating users during the presentation.

The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. In some implementations, an augmented reality environment may represent physical objects in the physical world as virtual objects in the augmented environment. A virtual reality environment may refer to a space that includes the virtual environment. The terms "space" and "environment" may be used interchangeably herein.

Virtual content may be perceived to lie in a three dimensional light field within a viewing user's field-of-view to create an interactive space. A system configured to present virtual content in an interactive space may comprise one or more of one or more light sources, one or more optical elements, one or more sensors, non-transitory electronic storage, one or more physical processors, and/or other components.

The one or more light sources may be configured to emit light forming images of virtual content. The one or more optical elements may be configured to provide the light emitted from the one or more light sources to one or more eyes of the user to generate a perceived three-dimensional light field within the user's field-of-view.

The non-transitory electronic storage may be configured to store virtual content information and/or other information. The virtual content information may define virtual content. The virtual content may include one or more virtual objects, one or more virtual presentation areas, one or more virtual tools, and/or other virtual content.

A virtual presentation area may include one or more of a central portion, a boundary, one or more virtual indicators, and/or other virtual content. Individual virtual indicators may represent individual scenes of a presentation. Selection of an individual virtual indicator may cause scene information defining an individual scene represented by the individual virtual indicator to be defined. The scene information defining an individual scene may specify one or more of one or more virtual objects visible at or near the central portion of the virtual presentation area for the individual scene, individual poses of the one or more virtual objects, and/or other information.

The one or more virtual tools may be positioned at or near the boundary of the virtual presentation area. An individual virtual tool may represent an individual effect, such as a participant permission, applicable to an individual scene or slide of a presentation. For example, an individual effect may be applicable to an individual virtual object present in an individual scene or slide of the presentation. An individual virtual tool may represent an application, or suite of effects, that may be applicable to an individual scene or slide of the presentation and/or to an individual object.

The one or more physical processors may be configured by machine-readable instructions. Executing the machine-readable instructions may cause the one or more physical processors to facilitate providing views of virtual content in an interactive space. The machine-readable instructions may comprise one or more computer program components. The one or more computer program components may comprise one or more of a control component, an input component, an application component, a presentation component, and/or other components.

The control component may be configured to control the one or more light sources to generate one or more images forming virtual content. The one or more images of the virtual content may be generated such that the virtual content may be perceived within a three-dimensional light field. The one or more light source may be controlled to generate one or more of an image forming an instance of the virtual presentation area, an image forming an instance of a first virtual tool, and/or other images forming other virtual content. The first virtual tool may represent a first participant permission applicable to one or more of individual scenes, to individual virtual objects within individual scenes, and/or to other virtual content.

The input component may be configured to obtain user input. This may include one or more of receiving such information, accessing such information, determining such information, and/or obtaining such information in other ways. User input may facilitate generating a first presentation including a first scene, and/or other scenes. The user input may comprise one or more of selecting a first virtual indicator to define first scene information for the first scene, posing a first virtual object on the central portion of the instance of the virtual presentation area, specifying one or more participant permissions to be applied to the first virtual object, and/or other input. Specifying the first participant permission to be applied to the first scene and/or first virtual object may be facilitated by the first virtual tool, for example, by the user perceiving that he or she is placing the first virtual tool on the first virtual object. The user may specify the first participant permission through interaction with a second virtual object. In some implementations, the second virtual object may be configured to appear as one or more of a menu, a button, and/or other user interface mechanism (see, e.g., FIG. 21).

The application component may be configured to specify a value of a first permissions parameter of the first presentation scene and/or first virtual object as a first value. The value specification by the application component may be responsive to the user specifying the first participant permission to be applied to the first presentation scene and/or first virtual object. The first value of the first permissions parameter may reflect the application of the first participant permission and/or other effects.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

FIG. 13 illustrates virtual content comprising a composite virtual object.

FIG. 14 illustrates user input to specify an effect on the composite virtual object of FIG. 13.

FIG. 15 illustrates user input to specify an effect on the composite virtual object of FIG. 13.

FIG. 16 illustrates user input to specify an effect on the composite virtual object of FIG. 13.

DETAILED DESCRIPTION

Figure 1:
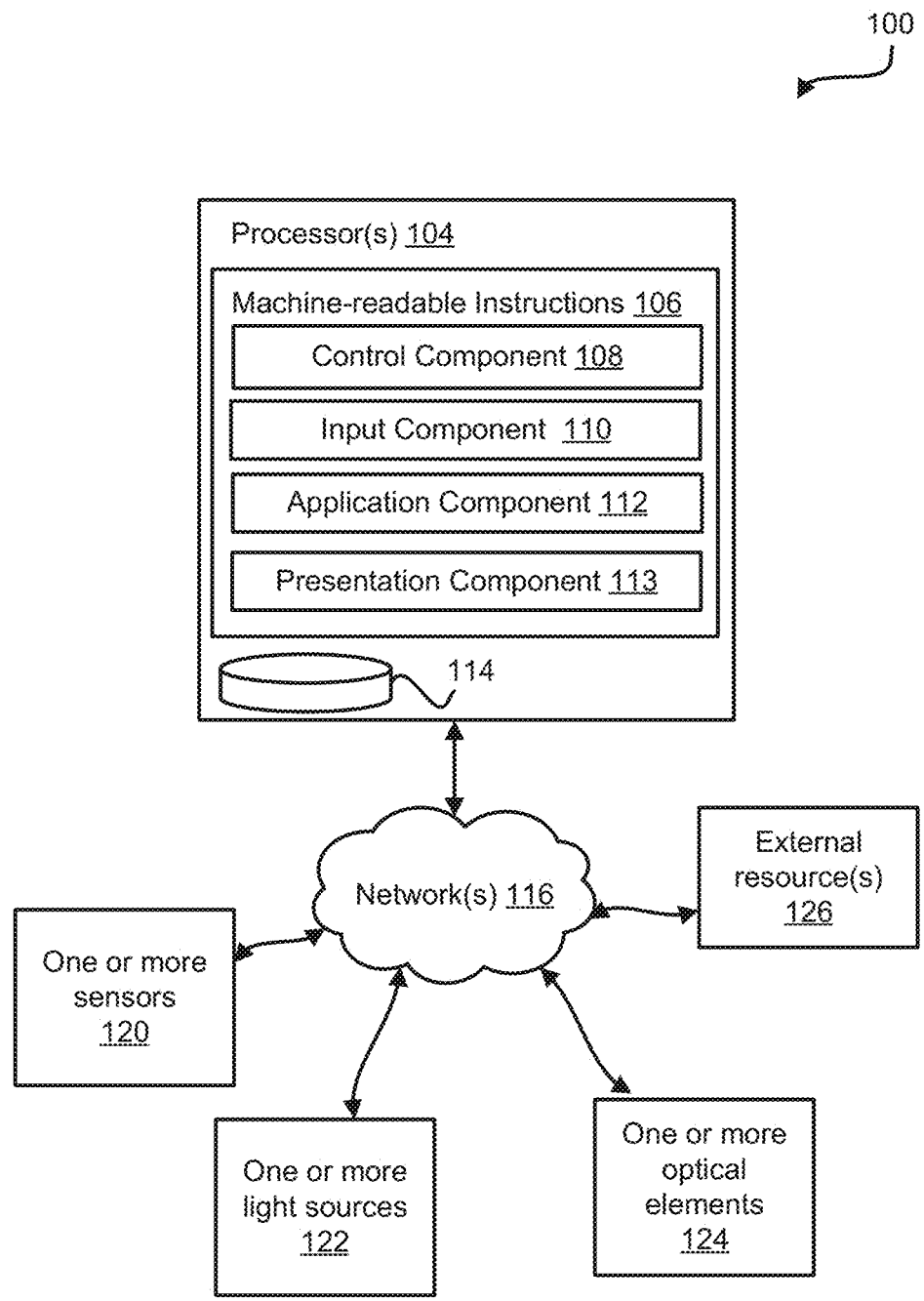
FIG. 1 illustrates a system configured to present virtual content in an interactive space, in accordance with one or more implementations.

FIG. 1 shows a system 100 configured to present virtual content in an interactive space. A virtual presentation area may be provided for generating and/or displaying presentations of virtual content. A presentation may include a set of scenes or slides. Individual scenes may depict virtual content. The virtual presentation area may act as a visual anchor for scenes of a presentation. The presentation generated using the virtual presentation area may be viewed by multiple users of the interactive space. One or more users generating the presentation (herein referred individually as "presenting users") may specify one or more permissions associated with one or more users viewing the presentation (herein referred individually as "participating users"). Permissions may be related to one or more parameters of virtual objects that may be controllable by individual participating users, and/or individual groups of participating users, during the presentation.

The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through systems, as described herein, employing hardware and/or software architectures to form virtual content (e.g., digital images) that may be perceived to be located in real-world space by virtue of the principles of the depth sensitive modules of the human brain.

The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. In some implementations, an augmented reality environment may represent physical objects in the physical world as virtual objects in the augmented reality environment. A virtual reality environment may refer to a space that includes the virtual environment. The terms "space" and "environment" may be used interchangeably herein.

The system 100 may include one or more of one or more physical processors 104, one or more sensors 120, one or more light sources 122, one or more optical elements 124, and/or other components. In some implementations, one or more components of system 100 may be incorporated in a head-mounted display (HMD), and/or other devices. By way of non-limiting illustration, one or more optical elements 124 may comprise at least part of a visor of an HMD.

In some implementations, individual light sources of one or more light sources 122 may be configured to emit light forming images of virtual content. An individual light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be received by one or more optical elements 124. In some implementations, control of position and/or light generation of individual light sources 122 may impact one or more aspects of a perceived three-dimensional light field and/or virtual content within the three-dimensional light field. One or more aspects of virtual content within a three-dimensional light field may include one or more of a perceived range of the virtual content from a user, a perceived depth of the virtual content, a perceived size of the virtual content, and/or other aspects of the virtual content.

In some implementations, one or more optical elements 124 may form at least part of a portion of a headset (not shown in FIG. 1) through which a user may view the real world. Individual optical elements of one or more optical elements 124 may be configured to provide the light emitted from the light source to an eye of the user to generate a perceived three-dimensional light field within the user's field-of-view. In some implementations, a headset (such as an HMD) may be configured to present images individually to each eye of the user as stereo image pairs. In this configuration, the headset may include a first set of components for one eye and a second set of components for another eye. The first set of components may include one or more lights sources, one or more optical elements, and/or other components. The second set of components may include one or more lights sources, one or more optical elements, and/or other components.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on a headset (not shown in FIG. 1) such that, when the headset is installed on the head of a user, the user's gaze may be directed toward one or more optical elements 124. In some implementations, one or more optical elements 124 may be arranged on a headset such that, when the headset is installed on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an interactive space. It is noted that the use of the term "light ray" is not intended to limit the scope of the disclosure to single, discrete, photons, and/or packets of photons. Instead, the disclosure may envision a light ray to mean a light beam comprising multiple and continuous photons, in one or more implementations.

In some implementations, one or more optical elements 124 may be arranged on a headset such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

Figure 20:
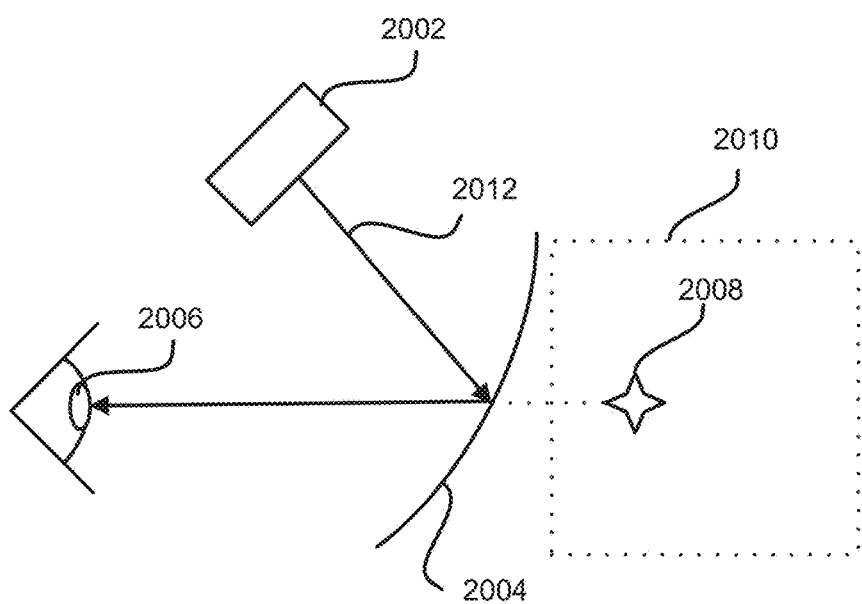
FIG. 20 illustrates an exemplary configuration of a light source and an optical element configured to generate virtual content to generate a perceived three-dimensional light field.

By way of non-limiting illustration, FIG. 20 shows an exemplary configuration of a light source 2002 and an optical element 2004 for generating virtual content 2008 to be perceived within a three-dimensional light field 2010. In some implementations, one or more of light source 2002, optical element 2004, and/or other components may be incorporated into a head-mounted display, and/or other devices. FIG. 20 shows a light beam 2012 emitted from light source 2002. The light beam 2012 may be directed at optical element 2004. The light beam 2012 may be provided into a user's eye 2006 via optical element 2004. The light beam 2012 may be part of light generated by light source 2002 to depict a digital image that may correspond to virtual content 2008 to be perceived by the user in three-dimensional real-world space.

Returning to FIG. 1, individual sensors of one or more sensors 120 may be configured to generate output signals conveying position information, and/or other information. Position information may include one or more of positions of one or more surfaces of one or more real-world objects within a real-world environment, ranges of one or more surfaces of one or more real-world objects from a sensor, and/or other information. In some implementations, a position of a surface may be expressed as one or more of distance from an individual sensor, an angle from reference line (e.g., a horizontal line), and/or other information. By way of non-limiting illustration, a position may be represented as a vector having vector components.

In some implementations, one or more sensors 120 may include one or more of a camera, a three-dimensional scanner, a depth sensor or depth camera, a rangefinder, a laser gauge, a time-of-flight sensor, an IR camera/emitter pair, a passive, structured, or unstructured light stereo pair, and/or other devices. A depth sensor or depth camera may include a three-dimensional volumetric imaging sensor, and/or other devices. In some implementations, sensor output of an individual sensor may comprise point cloud information and/or other information. Point cloud information may include a set of points that may lie on surfaces of real-world objects within a range of the sensor, and/or other sensor output. Point cloud information may specify individual ranges of individual points within three-dimensional space representing three-dimensional ranges of surfaces the individual points may lie on. The position information may include the point cloud information and/or may be derived from the point cloud information.

In some implementations, a sensor may comprise a camera. An individual camera may be configured to generate image information defining images of a real-world environment within a field-of-view of the camera. Position information may be determined from the image and/or other information using one or more image-based approaches. The one or more image-based approaches may include one or more of computer vision, object recognition, SIFT, SURF, position triangulation, and/or other techniques. While a point within a point cloud may represent a surface of a fingertip and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing a range of the surface of the fingertip.

In some implementations, one or more physical processors 104 may include and/or may be coupled to non-transitory electronic storage media 114 and/or other components. The non-transitory electronic storage media 114 may be configured to store virtual content information, scene information, and/or other information. Virtual content information may define virtual content. Virtual content may have features including one or more of form, size, shape, color, functionality, and/or other defining aspects. In some implementations, virtual content may include virtual objects.

It is noted that use of the term "virtual" followed by a named entity may mean that the named entity may be presented to a user via one or more optical elements 124 and may be perceived to lie within the real-world but may not actually appear in the real-world. In some implementation, descriptions of a named entity that may not be preceded by the term "virtual" may mean the named entity may be a real-world entity that appears in the real-world.

In some implementations, one or more aspects of virtual content may be defined based on values of one or more parameters of the virtual content. The parameters may include one or more of one or more size parameters, one or more color parameters, one or more display mode parameters, one or more permissions parameters, and/or other parameters.

Values of one or more size parameters for a virtual object may specify a perceived size of the virtual object. In some implementations, a size of the virtual object may be specified by a single value for the size parameter and/or a set of values for a set of size parameters. Values of a size parameter may be qualitative and/or quantitative. By way of non-limiting illustration, a value of a size parameter of a virtual object may be specified qualitatively as one or more of "small," "medium," "large," and/or descriptions. Individual qualitative values may be associated with predetermined sizes of the virtual object as it may be perceived by the user in an interactive space. In some implementations, a set of values may be specified for a set of size parameters. The set of size parameters may be associated with dimensions of a virtual object. By way of non-limiting illustration, a first size parameter may be associated with size in an x-dimension, a second size parameter may be associated with size in a y-dimension, and a third size parameter may be associated with a z-dimension. Quantitative values of a size parameter may specify numerical values and units of measurement used to specify size (e.g., millimeters, centimeters, and/or other units of measurement).

Values of one or more color parameters for a virtual object may specify color of the virtual object. Color may be defined with respect to a color space and/or other color specification. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, the color space may be an RGB color space, the first color may be red, the second color may be green, and/or the third color may be blue.

Values of one or more display mode parameters for a virtual object and/or virtual scene may specify the manner in which a virtual object may be displayed to a user in an environment involving the presentation of the virtual object or virtual scene by a presenting user to one or more participating users. Such an environment may be representative of a collaborative environment, and/or may be configured to allow for such collaboration among the presenting and/or participating users. By way of non-limiting illustration, the manner in which a virtual object may be displayed in such an environment may refer to one or more of a perspective by which the virtual object may be presented (e.g., plan view, isometric view, etc.), a static display of the virtual object, a movable display of the virtual object, an assembled view of the virtual object, an exploded view of the virtual object, and/or other manners in which a virtual object may be displayed. A value of a display mode parameter for a virtual object specifying a static display of the virtual object may mean that the virtual object may not be movable by one or more users in the interactive space. By way of non-limiting illustration, depending on the value of the display mode parameter for a virtual object and/or scene, the pose of the virtual object set by a presenting user may not change during a presentation as a result of user input by one or more participating users. A value of a display mode parameter for a virtual object specifying an interactive display of the virtual object may mean that the virtual object may be movable by one or more users of the interactive space during the presentation of that virtual object by the presenting user. By way of non-limiting illustration, the pose of the virtual object set by a presenting user may be changeable by one or more participating user during a presentation by virtue of user input from the one or more participating users.

Values of one or more permissions parameters for a virtual object may specify whether values of one or more other parameters of the virtual object may be controllable by one or more users (e.g., one or more participating users) of the interactive space. The term "controllable" may refer to the participating users ability to change one or more values of one or more parameters of the virtual object and/or scene. Control by participating users may be exercised through user input (see, e.g., input component 110). An ability (or inability) to change of one or more values of one or more parameters of a virtual object may affect the manner(s) by which a participating user may interact with the virtual object during the presentation and/or collaboration session based on providing user input. For example, values of one or more permissions parameters may be specified such that a participating user may passively view a presentation that is being controlled and configured by the presenting user. In some implementations, the participating user may only passively view a presentation that is being controlled and configured by the presenting user. By way of further non-limiting example, values of one or more permissions parameters may be specified such that a participating user may actively interact with virtual content in one or more manners during the presentation and/or collaboration session.

In some implementations, values of one or more permissions parameters may further specify one or more permissions that may be specifically associated with one or more participating users, or one or more scenes and/or slides in the presentation and/or collaboration session.

In some implementations, the assigned values of one or more permissions parameters may further specify the visibility or presentation of individual user interactions with virtual objects or scenes to the presenting user or to other participating users during presentation or collaboration session. For example, a presenting user may be able to specify the visibility or presentation of an individual participating user's interactions to another participating user, or alternatively, to the entire group of participating users. By way of non-limiting illustration, interactions by a first participating user may be specified as visible (or not visible) by one or more other participant users and/or by one or more presenting users. In some implementations, non-visibility may mean that the first participating user may be able to manipulate virtual objects and view their own manipulations, but other participating users may not be presented views of the presentation and/or collaboration session that reflect the first participating user's interactions with virtual objects. Instead, the other users may simply view the presentation as generated and/or configured by a presenting user. In some implementations, visibility may mean that the first participating user may be able to manipulate virtual objects and view their own manipulations, and one or more other users may also be presented views of the presentation that reflect the first participating user's interactions with virtual objects. In this sense, the first participating user may act as a pseudo and/or temporary presenting user by modifying a presentation as it is presented. The presentation may be configured to return the virtual object or scene to its initial configuration, values and/or parameters upon the participating user's selection of a new scene in the presentation, or upon the trigger of some other "reset" function made available during the presentation or collaboration session among the users.

By way of non-limiting illustration, a value of a first permissions parameter may specify whether a value of a size parameter and/or other parameters may be controllable by one or more participating users of the interactive space. The value of the first permissions parameter may be specified quantitatively and/or qualitatively. For example, to permit controllability of a value of a size parameter of a virtual object, the value of the first permissions parameter may specify "permit size changes," and/or other information. For example, to restrict controllability of a value of a size parameter of a virtual object, the value of the first permissions parameter may specify "do not permit size changes," and/or other information.

By way of non-limiting illustration, a value of a second permissions parameter may specify whether a value of a color parameter and/or other parameters may be controllable by one or more participating users of the interactive space. The value of the second permissions parameter may be specified quantitatively and/or qualitatively. For example, to permit controllability of a value of a color parameter of a virtual object, the value of the second permissions parameter may specify "permit color changes," and/or other information. For example, to restrict controllability of a value of a color parameter of a virtual object, the value of the second permissions parameter may specify "do not permit color changes," and/or other information.

By way of non-limiting illustration, a value of a third permissions parameter may specify whether a value of a display mode parameter and/or other parameters may be controllable by one or more participating users of the interactive space. The value of the third permissions parameter may be specified quantitatively and/or qualitatively. For example, to permit controllability of a value of a display mode parameter of a virtual object, the value of the third permissions parameter may specify "permit display changes," and/or other information. For example, to restrict controllability of a value of a display mode parameter of a virtual object, the value of the second permissions parameter may specify "do not permit display changes," and/or other information.

In some implementations, a value of a permissions parameter may specify one or more participating users and designate those one or more users with the ability to control or adjust the values of any number or variety of values associated with a specific virtual object or scene. For example, to permit controllability of a value of a first parameter of a virtual object for a first user and/or other users, a value of a permissions parameter may specify "permit changes of the first parameter for the first user," and/or other information.

In some implementations, a value of a permissions parameter may specify one or more participating users and the visibility of the interactions of the specified one or more participating users to other users participating in the presentation and/or collaboration session. For example, to permit controllability of a value of a first parameter of a virtual object for a first user and have interactions of the first user visible to a second user, a value of a permissions parameter may specify "permit changes of the first parameter for the first user, make visible to second user", and/or other information. For example, to permit controllability of a value of a first parameter of a virtual object for a first user and have interactions of the first user not visible to other users, a value of a permissions parameter may specify "permit changes of the first parameter for the first user, make visible to only first user", and/or other information.

In some implementations, virtual objects may include one or more of one or more virtual presentation areas, one or more virtual tools, one or more docks depicted as housing and/or containing virtual content, and/or other virtual content and/or applications.

A virtual presentation area may be provided for generating and/or displaying presentations of virtual content. The presentation may include a set of scenes. Individual scenes may depict virtual content. An individual scene may include one or more virtual objects posed on the virtual presentation area. A pose of a virtual object may include one or more of an aspect ratio, a zoom, a position, an orientation, and/or other arrangement of the virtual object.

In some implementations, a virtual presentation area and/or components of a virtual presentation area may be configured to be manipulated in an interactive space. By way of non-limiting illustration, the virtual presentation area may be rotatable, translatable, expandable, contractible, and/or may be manipulated in an interactive in other ways. In some implementations, manipulation of a virtual presentation area in an interactive space may be based on user input and/or other input (see, e.g., input component 110).

An individual scene of a presentation may be defined by scene information for the individual scene. Scene information defining the individual scene may specify one or more of one or more virtual objects visible on the virtual presentation area for the individual scene, individual poses of individual ones of the one or more virtual objects, and/or other information. Specifying a virtual object may include identifying the virtual object, determining values of one or more parameters of the virtual object, and/or other operations.

A virtual presentation area may include one or more of a central portion, a boundary, one or more virtual indicators, and/or other components.

The central portion of a virtual presentation area may include a portion of the virtual presentation area where one or more virtual object may be posed. A central portion may comprise a circular area and/or may comprise an area of other shapes. In some implementations, the central portion may provide one or more visual indications responsive to the posing of virtual objects on the central portion. By way of non-limiting illustration, the central portion may depict a first color when one or more virtual objects are added to the central portion; a second color when one or more virtual objects are removed from the central portion; and a third color when no virtual objects are present on the central portion. In some implementations, the first color may be green; the second color may be yellow; and the third color may be red. In some implementations, the second color (e.g., yellow) may be used when an object is initially being removed and/or attempted to be removed. In some implementations, after a threshold of time has been exceeded, the central portion may turn to the third color (e.g., red). In some implementations, after a second threshold of time has been exceeded with the third color active, removal of the object from the central portion may be completed.

A boundary may include an area of a virtual presentation area surrounding the central portion of the virtual presentation area. In some implementations, a boundary of a virtual presentation area may be perceived as having an area. For example, the boundary may be perceived as having a visible area extending from a peripheral edge of the central portion. In some implementations, the boundary may be perceived as having little or no area. For example, the boundary may be configured as a line with little or no perceivable surface area.

A virtual indicator may represent an individual scene of a presentation. In some implementations, a selection of an individual virtual indicator may cause scene information defining an individual scene represented by the individual virtual indicator to be defined. In some implementations, a quantity of virtual indicators present on a virtual presentation area may represent the quantity of scenes generated for a given presentation. Scenes may be added, removed, and/or modified based on user input (see, e.g., input component 110).

In some implementations, an individual virtual tool may represent an individual effect that may be applicable to individual virtual objects present in an individual scene of a presentation. In some implementations, one or more virtual tools may be positioned at or near the boundary of a virtual presentation area (see, e.g., FIG. 4). In some implementations, one or more virtual tools may be positioned at a virtual presentation area insofar the one or more virtual tools may be perceived to be attached to a boundary of the virtual presentation area. In some implementations, one or more virtual tools may be positioned near a virtual presentation area insofar the one or more virtual tools may be perceived to lie in three-dimensional space around the virtual presentation area but not attached to the virtual presentation area (see, e.g., FIG. 11).

In some implementations, application of one or more effects on a virtual object may specify one or more values of one or more parameters of the virtual object. In some implementations, an effect may include setting a participant permission. Application of one or more participant permissions on a virtual object may facilitate specification of one or more values of one or more permissions parameters of the virtual object.

Participant permissions may be associated with manners by which a user may interact with virtual objects while viewing a presentation. Manners of interaction may include sets of user inputs to manipulate one or more virtual objects during a presentation and/or collaboration session. The user inputs may include gesture-based inputs and/or other inputs (see, e.g., input component 110). User interactions with one or more virtual objects may effectuate change to one or more values of one or more parameters of the one or more virtual objects. By way of non-limiting illustration, participant permissions may be related to an ability to change one or more of a perceived size of a virtual object present on a scene of a presentation, a perceived color of a virtual object present on a scene of a presentation, a display mode of a virtual object present on a scene of a presentation (e.g., assembled view versus exploded view, isometric view versus plan view, etc.), a position of a virtual object present on a scene of a presentation (e.g., static display versus movable display), an orientation of a virtual object present on a scene of a presentation, and/or other permissions. By way of non-limiting illustration, a participating user may interact with a virtual object present in a scene of a presentation in one or more manners that may effectuate change in values of one or more of a size parameter of the virtual object, a color parameter of the virtual object, a display mode parameter of the virtual object, and/or other parameters of a virtual object.

An application of a participant permission to permit (or restrict) changes to a size of a virtual object and/or scene may specify a value of a permissions parameter to permit (or restrict) controllability of a value of a size parameter of the virtual object and/or scene. When a value of a permissions parameter permits controllability of the value of the size parameter of the virtual object and/or scene, a participating user may manipulate the virtual object present in a scene of a presentation and/or scene itself in a manner that changes the size of the virtual object and/or scene. By way of non-limiting illustration, the participating user may wish to zoom in on a virtual object. The zooming may be facilitated by one or more user inputs that change the perceived size of the virtual object (e.g., thereby modifying the value of the size parameter of the virtual object). When a value of a permissions parameter restricts controllability of the value of the size parameter of a virtual object, a participating user may not be able to manipulate the virtual object present in a scene of a presentation in a manner that changes the size of the virtual object. Instead, the virtual object may maintain a perceived size as set by a user who generated the scene and posed the virtual object, or as designated by the presenting user.

An application of a participant permission to permit (or restrict) changes to a color of a virtual object and/or scene may specify a value of a permissions parameter to permit (or restrict) controllability of a value of a color parameter of the virtual object. When a value of a permissions parameter permits controllability of the value of the color parameter of the virtual object, a participating user may manipulate the virtual object present in a scene of a presentation in a manner that changes the color of the virtual object. By way of non-limiting illustration, the participating user may wish to change a color of a virtual object from a first color to a second color. The change in color may be exercised through user inputs resulting in a change to the value of the color parameter of the virtual object. When a value of a permissions parameter restricts controllability of the value of the color parameter of the virtual object, a participating user may not be able to manipulate the color of the virtual object. Instead, the color of the virtual object may maintain the color set by a user who generated the scene and/or posed the virtual object, or as designated by the presenting user.

An application of a participant permission to permit (or restrict) changes to a display mode of a virtual object may specify a value of a permissions parameter to permit (or restrict) controllability of a value of a display mode parameter of the virtual object. When a value of a permissions parameter permits controllability of the value of the display mode parameter of the virtual object, a participating user may manipulate the virtual object present in a scene of a presentation in a manner that changes the display mode of the virtual object. By way of non-limiting illustration, the participating user may wish to view a virtual object in accordance with one or more of a specific perspective by which the virtual object may be presented (e.g., plan view, isometric view, etc.), an assembled view of the virtual object, an exploded view of the virtual object, and/or other display modes. The changes may be facilitated by one or more user inputs that modify the value of the display mode parameter of the virtual object. When a value of a permissions parameter restricts controllability of the value of the display mode parameter of a virtual object, a participating user may not be able to manipulate the virtual object present in a scene of a presentation in a manner that changes the display mode of the virtual object. Instead, the virtual object may maintain a display mode as set by a user who generated the scene and/or posed the virtual object, or as designated by the presenting user.

An application of a participant permission to permit (or restrict) changes to a position and/or orientation of a virtual object may specify a value of a permissions parameter to permit (or restrict) changes to the position and/or orientation of the virtual object. By way of non-limiting illustration, permitting (or restricting) changes to the position and/or orientation of the virtual object may be accomplished by virtue of the specified value of the permissions parameter causing a change in a value of a display mode parameter of the virtual object to specify "movable display of the virtual object" (or "static display of the virtual object"). For example, when a value of a permissions parameter of a virtual object causes a value of the display mode parameter of the virtual object to be specified as "movable display of the virtual object," changes to a position and/or orientation of the virtual object may be permitted during the presentation and/or collaboration session. For example, when a value of a permissions parameter of a virtual object causes a value of the display mode parameter of the virtual object to be specified as "static display of the virtual object," changes to a position and/or orientation of the virtual object may be restricted during the presentation and/or collaboration session.

Its noted that the above descriptions of a participant permissions are provided for illustrative purposes only; and are not to intended to be limiting. Instead, those skilled in the art will appreciate other participant permissions may be applied to a virtual object within the context of a virtual presentation and/or collaboration. Further, it is noted that permissions and/or restrictions applied to individual virtual objects may similarly be applied to a virtual scene as a whole.

In some implementations, a dock may comprise a virtual object and/or system of interconnected virtual objects that may be perceived within a viewing user's field-of-view. The dock may be configured to be perceived as surrounding a user (e.g., annular-shaped). The dock may be configured to be manipulated in an interactive space. By way of non-limiting illustration, the dock may be rotatable, translatable, expandable, contractible, and/or may be manipulated in an interactive in other ways. In some implementations, manipulation of a dock in an interactive space may be based on user input and/or other input (see, e.g., input component 110) during a presentation and/or collaboration session.

In some implementations, a dock may comprise a set of sockets and/or other components. Individual sockets may be positioned at discrete locations on the dock. For example, the set of sockets may be arranged with regular spacing around the dock, and/or arranged in other ways.

A dock may be configured to simulate removable attachment of individual virtual objects to individual sockets of the dock. In some implementations, virtual objects attached to the dock may be removed and/or placed on a virtual presentation area to generate a scene of a presentation.

In some implementations, attachment of a virtual object to a socket may comprise at least one surface of the virtual object simulating a contact with at least one surface of a given socket. In some implementations, when a virtual object is in an attached state attached to a socket of a dock, the virtual object may move with the dock as the dock is manipulated within an interactive space during a presentation and/or collaboration session.

Figure 5:
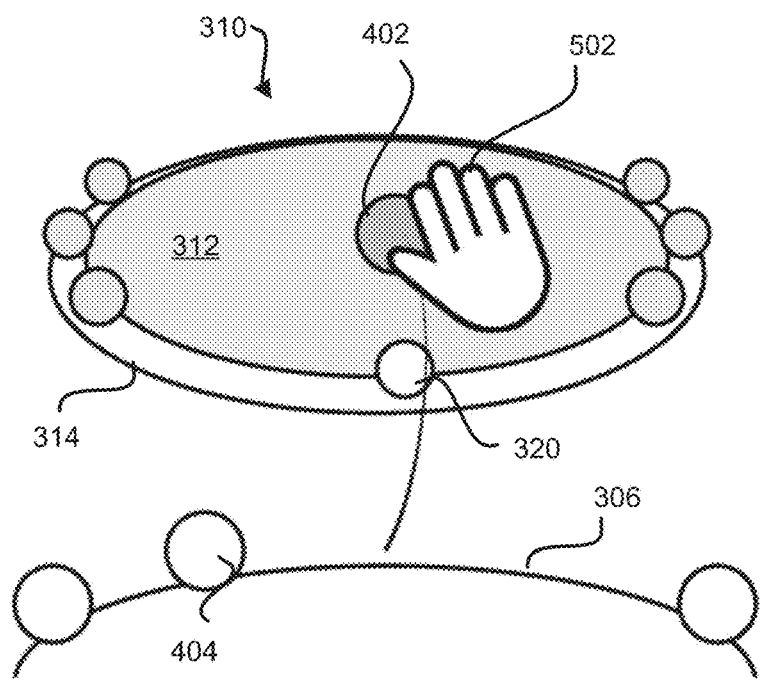
FIG. 5 illustrates a view of virtual content within the interactive space of FIG. 3 as perceived by the user of the interactive space.

In some implementations, a detachment of a virtual object from a socket of a dock may be facilitated based on the virtual object being moved away from the dock (see, e.g., FIG. 5). In some implementations, when a virtual object is detached from a socket, changes in position (e.g., also referred to as "positional state") of the virtual object may be facilitated. Changing positional state of individual virtual objects may be based on user input and/or other input (see, e.g., input component 110) during a presentation and/or collaboration session.

In some implementations, a virtual object appearing on a dock may have a different appearance when placed on a virtual presentation area. For example, a virtual object on the dock may have a generic shape, and placement of the virtual object on the virtual presentation area may cause the virtual object to appear according to a specified appearance or form of the virtual object. The generic shape may be spherical and/or other shapes. Once placed on a virtual presentation area, the virtual object may take an intended appearance or form of the virtual object. By way of non-limiting illustration, a virtual object may depict a car and/or other shapes. A virtual object having a spherical shape may be included on a dock and may represent the car virtual object. When placed and posed on the central portion of the virtual presentation area, the virtual object may change its appears to depict the car.

In some implementations, individual virtual objects may be associated with one or more application programs. An individual virtual object may be associated with an individual application program by virtue of user interaction with the individual virtual object resulting in system 100 providing and/or initiating the application program in an interactive space and/or providing an interface to the individual application program in the interactive space. An application program may include one or more of a web-browser, a game, a word processor, a three-dimensional object file, a gallery of application programs, a virtual desktop, applications running on a virtual desktop, personal contacts, one or more software-enabled applications used in an interactive space, a presentation program (e.g., for generating and/or presenting presentations using a virtual presentation area) and/or other application programs. In some implementations, utilizing a virtual object associated with the presentation program may generate an instance of virtual presentation area within a user's view of the real-world to facilitate a presentation and/or collaboration session.

Figure 3:
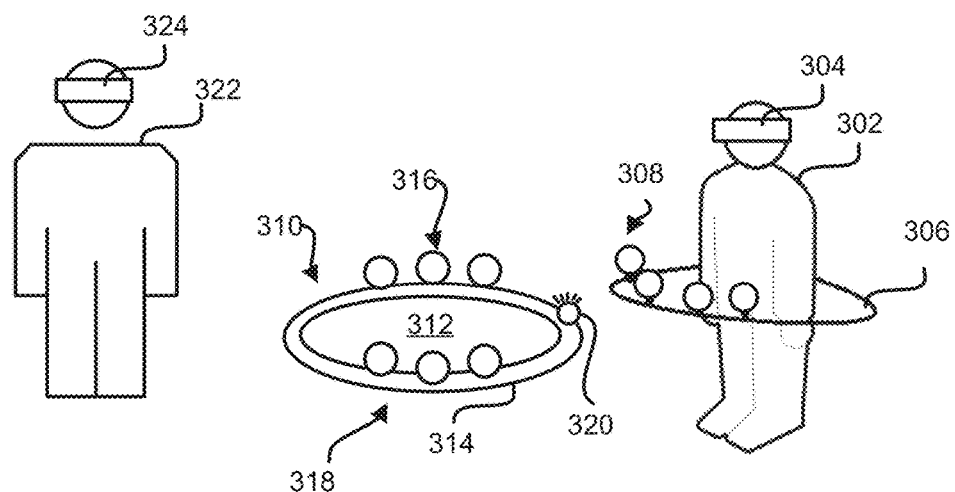
FIG. 3 illustrates a user and views of an interactive space.

FIG. 3 illustrates a first user 302, a second user 322, and a view of an interactive space, in accordance with one or more implementations of system 100 (FIG. 1) presented herein. The first user 302 may be wearing an HMD 304 and/or other components. The HMD 304 may include one or more components of system 100 (FIG. 1) to facilitate presenting virtual content in the interactive space. The second user 322 may be wearing an HMD 324 and/or other components. The HMD 324 may include one or more components of system 100 (FIG. 1) to facilitate presenting virtual content in the interactive space during a presentation and/or collaboration session. The first user 302 may be a presenting user. The second user 322 may be a participating user.

The virtual content may include one or more of a dock 306, a virtual presentation area 310, and/or other virtual content. The dock 306 may include a set of virtual objects 308 perceived as being attached to dock 306. In some implementations, views of dock 306 may be generated such that dock 306 may be perceived as surrounding user 302. The virtual presentation area 310 may include one or more of a central portion 312, a boundary 314, a first set of virtual tools 316, a second set of virtual tools 318, a first virtual indicator 320, and/or other content. The manners in which second user 322 may interact with virtual objects present on scenes of a presentation presented via virtual presentation area 310 may be dictated by the setting of participant permissions by first user 302 and/or other users.

Figure 21:
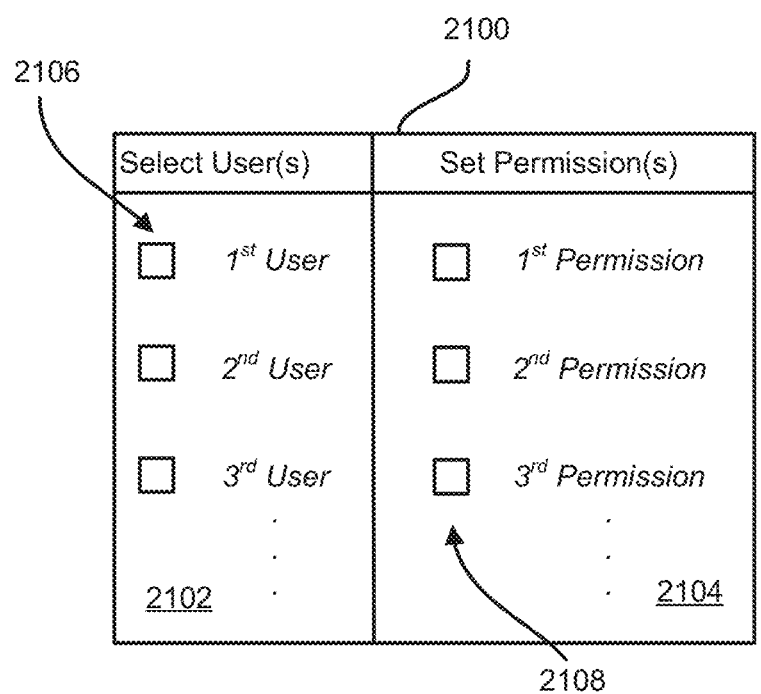
FIG. 21 illustrates an implementation of a menu interface configured to facilitate selection of permissions and/or users.

FIG. 21 illustrates an implementation of a menu interface 2100 configured to facilitate setting of participant permissions for one or more participating users. In some implementations, interface 2100 may be in the form of a pop-up window or menu appearing in an interactive space. The interface 2100 may include a first portion 2102 listing one or more participating users; and a second portion 2104 listing one or more permissions. Users may be listed by one or more of name, username, and/or other identifying information. A user interacting with interface 2100 may make one or more selections of one or more users to apply one or more permissions. For example, individual users may be selected using individual check boxes in a set of check boxes 2106 designating users and/or via other selection mechanism. Individual permissions may be selected using individual check boxes in a set of check boxes 2108 designating permissions and/or via other selection mechanism. Other selection mechanisms may include one or more of drop down menus, text input fields, and/or other selection mechanisms.

Returning to FIG. 1, one or more physical processors 104 may be configured by machine-readable instructions 106. Executing machine-readable instructions 106 may cause one or more physical processors 104 to facilitate providing views of virtual content in an interactive space. The machine-readable instructions 106 may include one or more of a control component 108, an input component 110, an application component 112, a presentation component 113, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include control of the generation and/or emission of light to generate images forming virtual content, and/or other types of control.

By way of non-limiting illustration, control component 108 may be configured to control one or more light sources 122 to generate an image forming an instance of a virtual presentation area and/or other virtual content. The control component 108 may be configured to control one or more light sources 122 to generate an image forming an instance of a first virtual tool and/or other virtual content. The first virtual tool may represent a first effect applicable to individual virtual objects. The first effect may include a first participant permission. The first virtual tool may be perceived at a first virtual position at or near a boundary of the instance of the virtual presentation area, and/or other locations.

In some implementations, input component 110 may be configured to obtain user input for manipulating virtual content in an interactive space. The user input may comprise gesture based input and/or other input. In some implementations, user input may be derived from one or more of sensor output of one or more sensors 120, sensor output from one or more other sensors, and/or other sources. The input component 110 may be configured to detect and/or recognize one or more real-world objects based on sensor output from one or more sensors 120. A real-world object may include, for example, a human hand and/or other user appendage. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object. Recognition of a real-world object may include identification of the presence of the real-world object.

In some implementations, input component 110 may be configured to identify gestures and/or actions being performed by one or more real-world objects. A gesture and/or action may include one or more of reaching, grabbing, releasing, swiping, pinching, pulling, throwing, clicking, pointing, pushing, and/or other gestures and/or actions of real-world objects. By way of non-limiting illustration, input component 110 may utilize one or more gesture recognition techniques to identify one or more gestures and/or actions being performed by one or more real-world objects. The input component 110 may be configured to provide one or more identified gestures and/or actions as user input for manipulating virtual content in an interactive space.

The input component 110 may be configured to obtain user input comprising gesture-based inputs for manipulating one or more virtual objects. Manipulating a virtual object may include a series of gesture-based inputs. The gesture-based inputs may include one or more of a gesture of grabbing the virtual object, a gesture of holding the virtual object, changing position of the virtual object while the virtual object is in a held state, a gesture of releasing the virtual object from a held state, and/or other input. In some implementations, the series of gestures described above may be referred to as a "drag-and-drop" gesture.

In some implementations, the manipulation may include one or more of removing one or more virtual objects from a dock, posing one or more virtual objects on a central portion of a virtual presentation area, grabbing one or more virtual tools, simulating a contact of a virtual tool with a virtual object on a virtual presentation area, and/or other manipulation.

In some implementations, user input for generating a presentation may comprise one or more of selecting one or more virtual indicators, posing one or more virtual objects, specifying one or more effects (such as participant permissions) to apply to one or more virtual objects, and/or other user input.

In some implementations, selecting a virtual indicator may include a set of gesture-based inputs. The set of gesture-based inputs may include one or more of a gesture of pointing at the virtual indicator, a gesture of clicking the virtual indicator, a gesture of tapping the virtual indicator, and/or other input.

In some implementations, posing virtual objects may include a set of gesture-based inputs. The set of gesture-based inputs may include one or more of a gesture of grabbing the virtual object, a gesture of moving the virtual object to a central portion of a virtual presentation area, a gesture of rotating the virtual object (and/or other orientation changes), a gesture of releasing the virtual object, and/or other input.

In some implementations, specifying one or more effects to apply to virtual objects may include a set of gesture-based inputs. The set of gesture-based inputs may include a drag-and-drop gesture. By way of non-limiting illustration, the set of gestures may include one or more of a gesture of grabbing a virtual tool, a gesture of moving the virtual tool at or near a position of a virtual object, a gesture of releasing the virtual tool at or near the position of the virtual object, and/or other input. In some implementations, "at or near" may refer to one or more of a simulated contact of the virtual tool with the virtual object, the virtual tool coming within a threshold distance from the virtual object, and/or other considerations. In some implementations, a set of gestures may facilitate effectuating a change in position of a virtual tool from a starting virtual position to an ending virtual position at or near a virtual position of the virtual object on a central portion. In some implementations, user input including releasing a virtual tool at or near a position of a virtual object may be aided by a precision pointer (see, e.g., FIG. 12).

Figure 17:
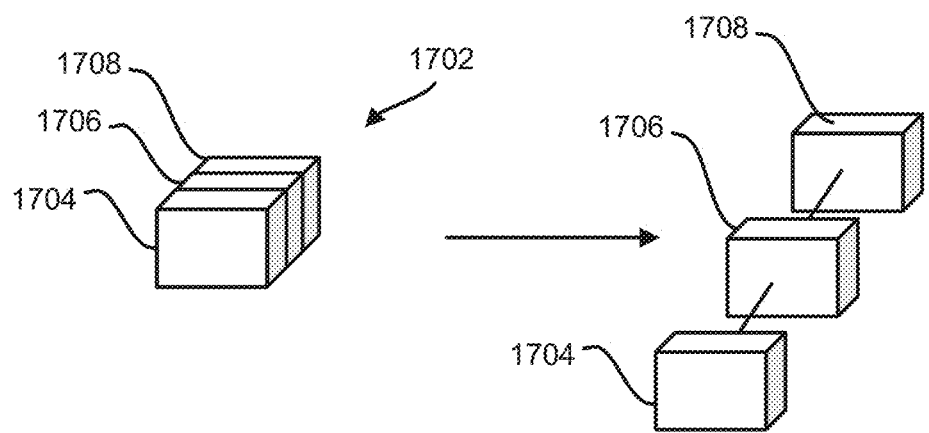
FIG. 17 illustrates a change of a display of a virtual object from an assembled view to an exploded view.

In some implementations, one or more participating user's inputs to interact with virtual objects may include a set of gesture-based inputs. For example, user inputs to interact in accordance with an individual manner of interaction may include an individual set of gestured-based inputs. The individual manner of interaction may include expanding a view of a virtual object from an assembled view to an exploded view. The individual set of gesture-based inputs may include one or more of a gesture of grabbing a virtual object, a gesture of pulling apart the virtual object, a gesture of releasing the virtual object, and/or other input. By way of non-limiting illustration, FIG. 17 illustrates an expanding of a view of a virtual object from an assembled view to an exploded view. A composite virtual object 1702 may be formed by a set of multiple virtual objects. The assembled view of composite virtual object 1702 is shown in the left side of FIG. 17 The exploded view of composite virtual object 1702 is shown on the right side of FIG. 17.

In some implementations, user input to obtain an exploded view of composite virtual object 1702 may comprise a series of gestures which allow the user to control the amount and/or manner in which composite virtual object 1702 may be exploded. For example, a user may perform gestures in order to accomplish one or more of first virtual object 1704 exploded outward from the remaining second virtual object 1706 and third virtual object 1708, first virtual object 1704 and second virtual object 1706 exploded outward from third virtual object 1708 (e.g., with first virtual object 1704 and second virtual object 1706 assembled together), and/or other control of the exploded view. In some implementations, a distance in which an individual virtual object may be displayed as "exploding" outward from one or more other virtual objects of a composite virtual object may be controlled by a user. By way of non-limiting illustration, a user may perform a gesture of pulling a virtual object outward to the desired "exploded" distance. In some implementations, a direction in which an individual virtual object may be displayed as "exploding" outward from one or more other virtual objects of a composite virtual object may be controlled by a user. By way of non-limiting illustration, a user may perform a gesture of pulling a virtual object outward along the desired "exploded" direction. In some implementations, a participating user may utilize virtual tools.

Figure 18:
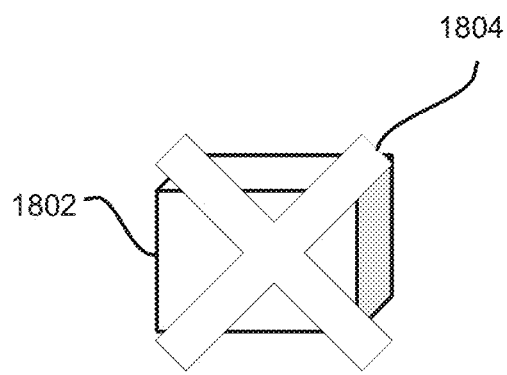
FIG. 18 illustrates a visual indicator indicating that changes in position and/or orientation of a virtual object is not permitted.

In some implementations, the individual manner of interaction may include changing a position and/or orientation of a virtual object. The individual set of gesture-based inputs may include a drag-and-drop gesture and/or other gesture based inputs. In some implementations, if a participant permission does not permit changes to position and/or orientation, one or more visual indicators may be presented in response to user input attempting to change position and/or orientation. By way of non-limiting illustration, FIG. 18 illustrates a virtual object 1802 and a visual indicator 1804 indicating that changes in position and/or orientation may not be permitted for virtual object 1802.

Figure 19:
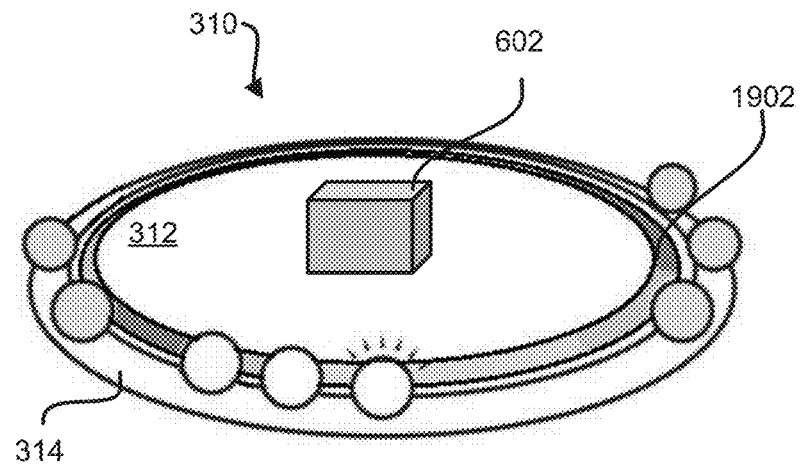
FIG. 19 illustrates a color wheel on a virtual presentation area used to change a color of a virtual object (when permitted).

In some implementations, an individual manner of interaction may include changing a color of a virtual object. An individual set of gesture-based inputs may include one or more of a gesture of tapping a virtual object, a gesture of tapping a color from a color wheel, and/or other input. By way of non-limiting illustration, FIG. 19 illustrates a color wheel 1902 generated on a virtual presentation area 310 to change a color of a virtual object 602. For example, the color wheel 1902 may be displayed to the user as a border surrounding the central portion 312 of the presentation area.

Returning to FIG. 1, in some implementations, input component 110 may be configured to track a user appendance as the user performs gestures or otherwise interacts with content in an interactive space. By way of non-limiting illustration, a hand may be tracked by determining positions of one or more features of the hand using position information and/or other information. Positions of one or more features of a hand may be determined through one or more iterations including operations of determining estimated positions of individual features from estimated positions of other ones of the features. Such an iterative procedure may be performed as position information may be obtained. The position information may be obtained based on a sampling rate of a given sensor.

In some implementations, an estimated position of a first feature of a hand may be determined from position information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may comprise one centimeter, and/or other distances.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given a position of a first feature of a hand, a position of a second feature may be determined based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

Figure 4:
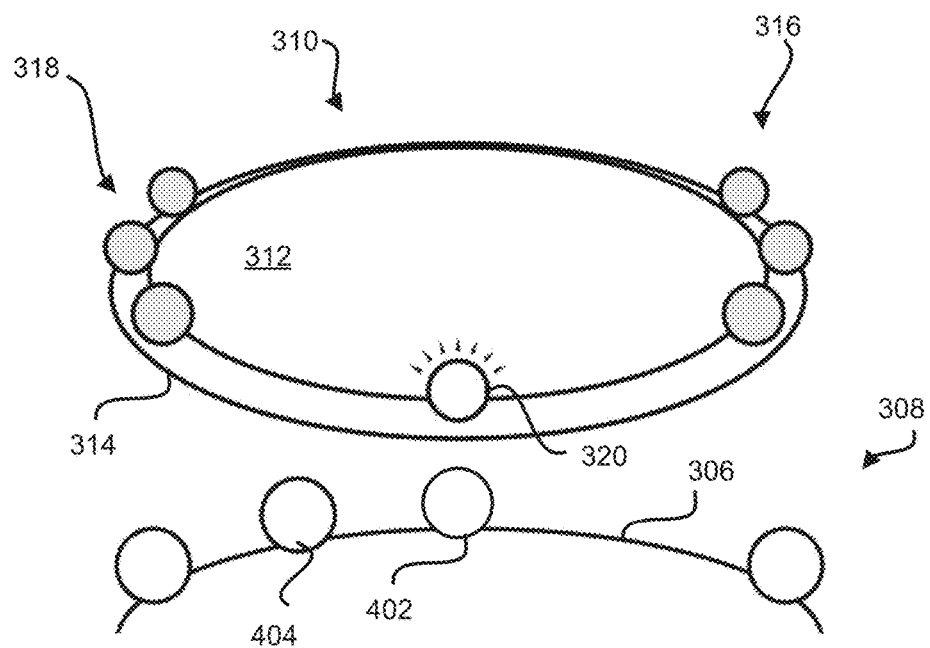
FIG. 4 illustrates a view of virtual content within the interactive space of FIG. 3 as perceived by the user of the interactive space.

FIG. 4 illustrates a view of virtual content within the interactive space of FIG. 3 as perceived by user 302 of the interactive space. The user may provide input to select the first virtual indicator 320. The first virtual indicator 320 may represent a first scene of a presentation. The user input comprising selecting the first virtual indicator 320 may cause first scene information for the first scene to be defined. In FIG. 4, set of virtual objects 308 attached to dock 306 may include one or more of a first virtual object 402, a second virtual object 404, and/or other virtual objects.

FIG. 5 illustrates a view of virtual content within the interactive space of FIG. 3 as perceived by user 302 of the interactive space. A user object 502 is shown. The user object 502 may comprise the user's real-world hand and/or may be provided as a virtual object representing the user's hand. For example, user object 502 may be provided as a virtual object to aid the user in perceiving their real-world manipulation with respect to virtual content presented to them. The user object 502 as a virtual object may be superimposed over views of the user's real-world hand.

FIG. 5 illustrates user input to select one or more virtual objects to pose on central portion 312. By virtue of first virtual indicator 320 being selected (FIG. 4), virtual objects posed on central portion 312 may be included in the definition of first scene information of the first scene. The user input may include one or more gesture-based inputs to pose first virtual object 402 on central portion 312. The one or more gesture-based inputs may include a drag-and-drop input of the first virtual object 402 from dock 306 to a desired location on central portion 312. The central portion 312 may respond to the user inputs through one or more color changes as presented herein.

Figure 6:
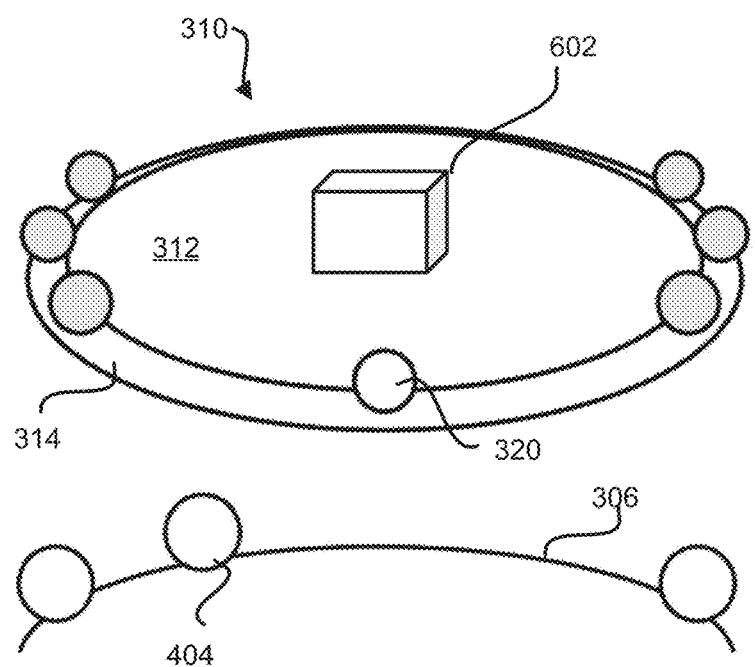
FIG. 6 illustrates a view of virtual content within the interactive space of FIG. 3 as perceived by the user of the interactive space.

FIG. 6 illustrates another view of virtual content within the interactive space of FIG. 3 as perceived by user 302 of the interactive space. By way of non-limiting illustration, FIG. 6 illustrates the result of the user input illustrated in FIG. 5. A virtual object 602 is shown. As presented herein, virtual objects present on a dock may appear differently than they may when the virtual objects are added to a scene. By way of non-limiting illustration, first virtual object 402 (FIG. 5) may represent a generic, or low fidelity, form of virtual object 602 in FIG. 6.

The user may provide further input to complete the generation of the first scene and/or proceed to generating a subsequent slide. The user input may include selecting the first indicator 320 and/or other user input. The first scene information for the first scene may include one or more of a specification of the virtual object 602, the pose of virtual object 602 on central portion 312, one or more values of one or more parameters of the virtual object 602 (see, e.g., application component 112), and/or other information.

Figure 7:
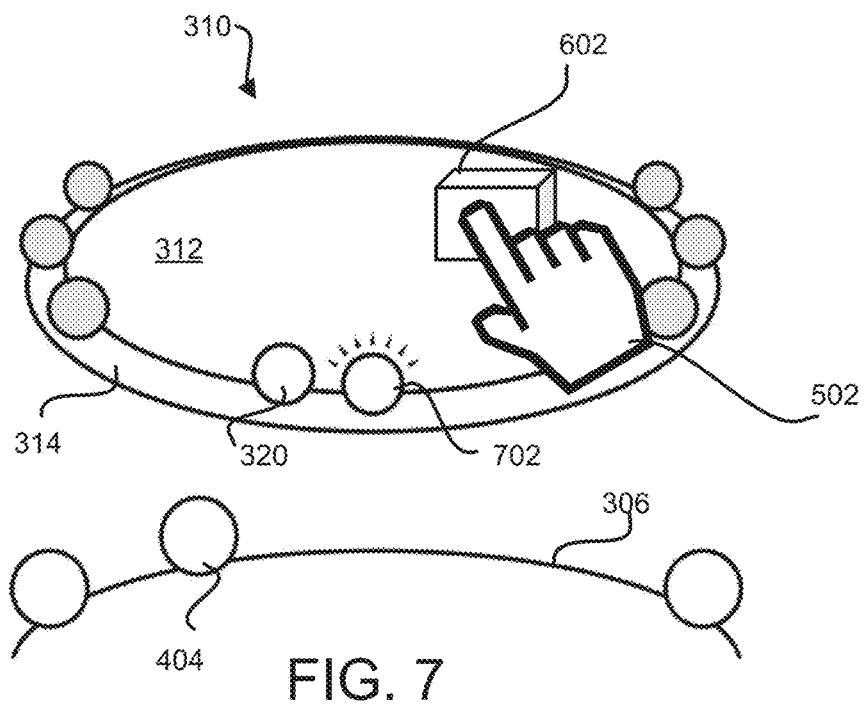
FIG. 7 illustrates a view of virtual content within the interactive space of FIG. 3 as perceived by the user of the interactive space.

FIG. 7 illustrates another view of virtual content within the interactive space of FIG. 3 as perceived by user 302 of the interactive space. In FIG. 7, once the first scene has been generated, a second scene may be generated. A second virtual indicator 702 is shown indicating that second scene information defining the second scene may be ready to be defined. For illustrative purposes, the user may provide user input to pose virtual object 602 on the second scene differently than the first scene (FIG. 6). It is noted that the differences in depiction of user object 502 in FIG. 7 and FIG. 5 are not intended to be limiting. Instead, the different depictions are provided to show that user object 502 provided as a virtual object may have one or more visual depictions. The user may provide further input to complete the generation of the second scene and/or proceed to generating a subsequent slide. The user input may include selecting second virtual indicator 702 and/or other user input. The second scene information for the second scene may include one or more of a specification of virtual object 602, the pose of virtual object 602 on central portion 312, one or more values of one or more parameters of the virtual object 602 (see, e.g., application component 112), and/or other information.

Figure 8:
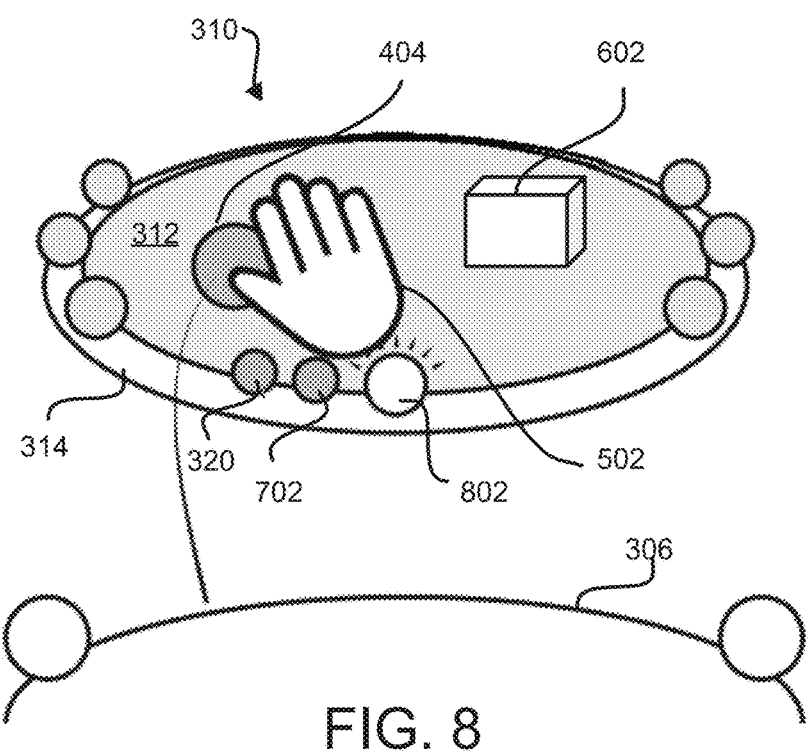
FIG. 8 illustrates a view of virtual content within the interactive space of FIG. 3 as perceived by the user of the interactive space.

FIG. 8 illustrates another view of virtual content within the interactive space of FIG. 3 as perceived by user 302 of the interactive space. In FIG. 8, once the second scene has been generated, a third scene may be generated. A third virtual indicator 802 is shown indicating that third scene information defining the third scene may be ready to be defined. For illustrative purposes, the user may provide input of adding additional one or more virtual objects to the third scene. The user input may include a drag-and-drop input to introduce and/or pose second virtual object 404 to central portion 312 as part of the third scene. The central portion 312 may respond to the user input introducing and/or posing second virtual object 404 through one or more color changes as presented herein.

Figure 9:
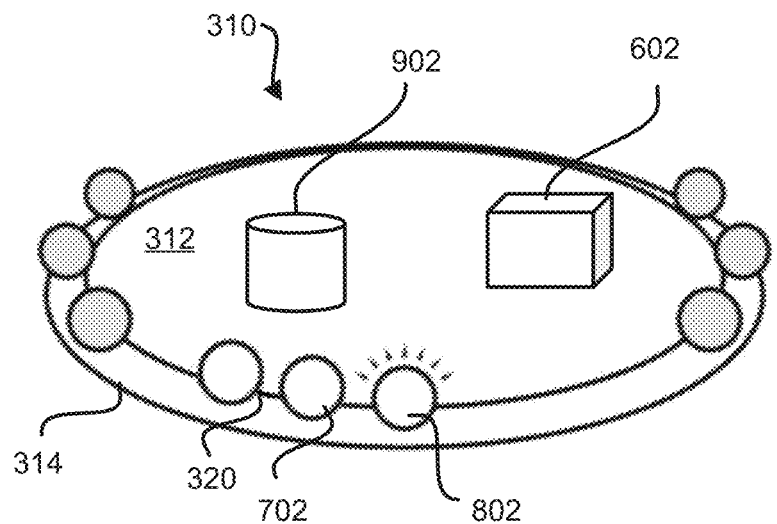
FIG. 9 illustrates a view of virtual content within the interactive space of FIG. 3 as perceived by the user of the interactive space.

FIG. 9 illustrates another view of virtual content within the interactive space of FIG. 3 as perceived by user 302 of the interactive space. By way of non-limiting illustration, FIG. 9 illustrates the result of the user input illustrated in FIG. 8. A virtual object 602 is shown. As presented herein, virtual objects present on a dock may appear differently than when the virtual objects are added to a scene. By way of non-limiting illustration, second virtual object 404 (FIG. 5) may represent a generic form of virtual object 902 in FIG. 9.

The user may provide further input to complete the generation of the third scene and/or proceed to generating a subsequent slide. The user input may include selecting the third indicator 820 and/or other user input. The third scene information for the first scene may include one or more of a specification of the virtual object 602, a specification of virtual object 902, the pose of virtual object 602 on central portion 312, the pose of virtual object 902 on central portion 312, one or more values of one or more parameters of the virtual object 602 (see, e.g., application component 112), one or more values of one or more parameters of the virtual object 902 (see, e.g., application component 112), and/or other information. The user may rotate back and forth among the scenes/slides based on a user gesture or other interaction with the virtual indicators (e.g., one or more of 320, 702, and/or 802) of virtual presentation area 310.

Figure 10:
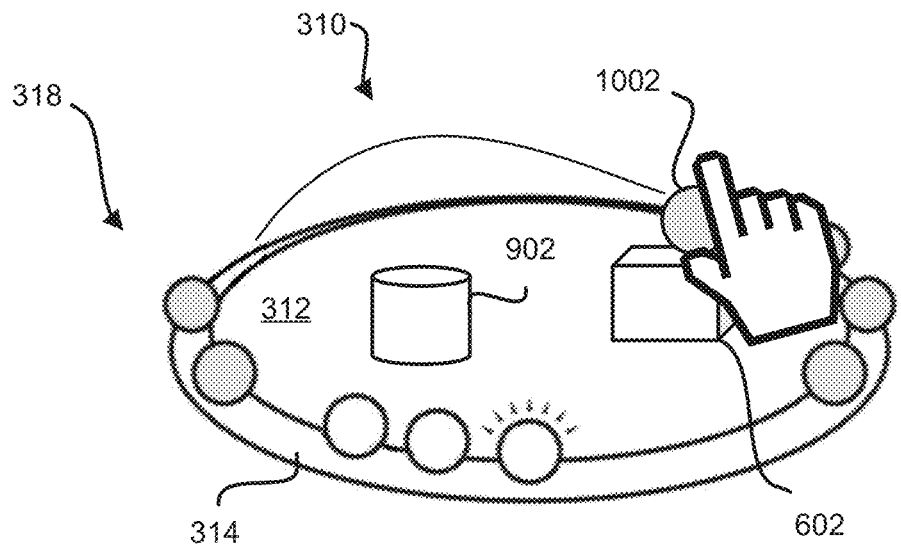
FIG. 10 illustrates a view of virtual content within the interactive space of FIG. 3 as perceived by the user of the interactive space.

FIG. 10 illustrates a view of virtual content within the interactive space of FIG. 3 as perceived by user 302 of the interactive space. In particular, FIG. 10 illustrates user input to specify one or more effects to be applied to one or more virtual objects appearing on the third scene of the presentation and/or user input to specify one or more applications to be used in concert with the various objects and scenes in the presentations. By way of non-limiting illustration, the user may provide drag-and-drop input and/or other input to select a first virtual tool 1002 included in second set of virtual tools 318. The first virtual tool 1002 may be associated with a first effect. The drag-and-drop user input to specify the first effect to be applied to the virtual object 602 may comprise effectuating a change in position of the first virtual tool 1002 from its position at or near boundary 314 of virtual presentation area 310 to a position at or near the position of the virtual object on 602 on central portion 312.

In some implementations, during performance of one or more gesture-based inputs, an interface may be presented (not shown in FIG. 10) which may facilitate further input to specify one or more specific users (e.g., an individual user and/or individual groups of users) to which a current participant permission may be applied to. The interface may include, for example a pop-up window listing participating users from which the presenting user may select from. In some implementations, a default setting may include effects being applied to all participating users unless otherwise specified by a presenting user.

In some implementations, during performance of one or more gesture-based inputs, an interface may be presented (not shown in FIG. 10) which may facilitate further input to specify visibility of user interactions. The interface may include, for example a pop-up window listing participating users from which the presenting user may select from. In some implementations, a default setting may include the individual user interactions being visible to the individual user and no other users. By way of non-limiting illustration, referring back to FIG. 3, one or more user interactions by second user 322 may be visible to one or more of second user 322 only, second user 322 and first user 302, second user 322 and one or more other participating users, and/or other users.

Figure 11:
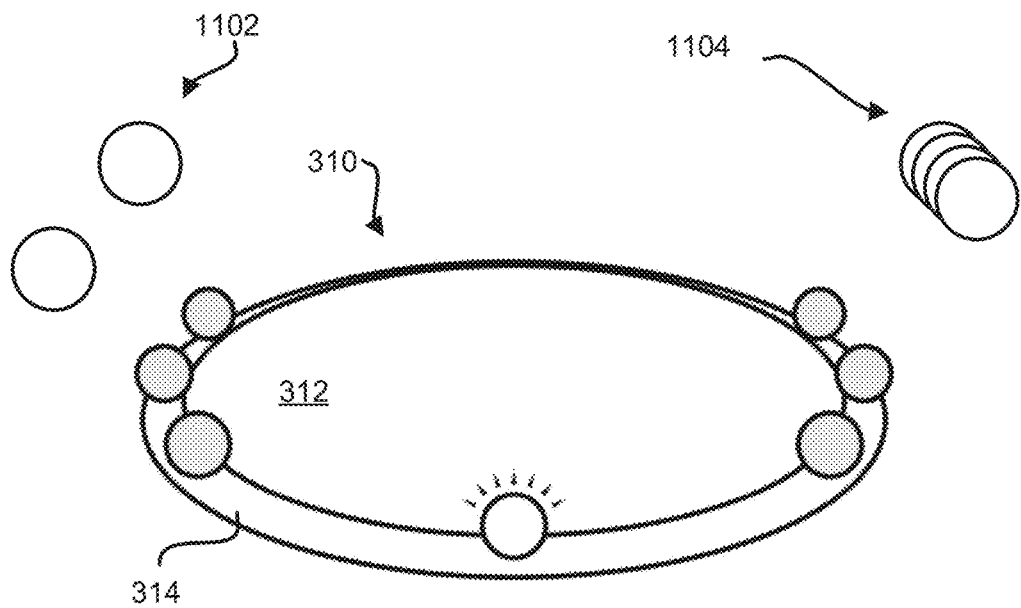
FIG. 11 illustrates a view of virtual content within an interactive space as perceived by a user of the interactive space.

FIG. 11 illustrates a first set of virtual tools 1102 and a second set of virtual tools 1104 perceived to lie in three-dimensional space near virtual presentation area 310. The first set of virtual tools 1102 may include one or more individual virtual tools. The second set of virtual tools 1104 may include a library of virtual tools. The library of virtual tools may include multiple virtual tools. Selection of the second set of virtual tools 1104 may cause the library to expand, exposing individual ones of the virtual tools for individual selection by a user. In some implementations, the library of virtual tools may be provided in a visual form including one or more of a rolodex, a virtual shelf depicted as supporting multiple virtual tools, and/or other visual forms.

Figure 12:
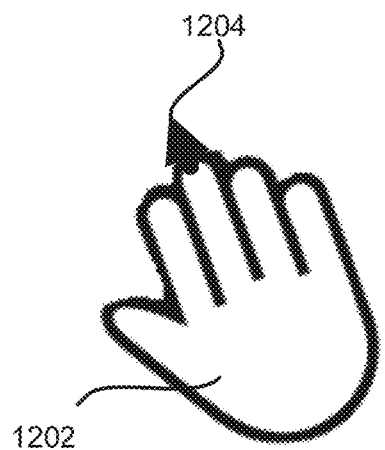
FIG. 12 illustrates a view of virtual content representing a user.

FIG. 12 illustrates a view of virtual content representing a user (e.g., the user's hand). The virtual content may include virtual object 1202 depicting a hand, and/or other virtual objects. In some implementations, user input including selecting a virtual object or tool, and/or releasing a virtual tool at or near a position of a virtual object may be aided by a precision pointer 1204 added to virtual object 1202. The precision pointer 1204 may comprise an arrow, arrowhead, and/or other depictions. The precision pointer 1204 may project from a digit of the virtual object 1202 depiction the hand. The precision pointer 1204 may project from a center digit and/or knuckle of virtual object 1202.

FIG. 13 illustrates virtual content comprising a composite virtual object 1302. The composite virtual object 1302 may be formed by a set of multiple virtual objects. The set of multiple virtual object may include one or more of a first virtual object 1304, a second virtual object 1306, a third virtual object 1308, and/or other virtual objects.

FIGS. 14-16 illustrate user input to specify an effect on composite virtual object 1302. Individual effects may be applied to individual virtual objects within composite virtual object 1302. In some implementations, user input to specify individual effects for individual virtual objects making up composite virtual object 1302 may comprise a gesture of pushing a virtual tool and/or other user inputs. By way of non-limiting illustration in FIG. 14, a user object 1402 representing a user may simulate movement of a virtual tool 1404 to within a threshold distance of first virtual object 1304 illustrating a desire to apply an effect to first virtual object 1304. The first virtual object 1304 may be visually highlighted to represent that first virtual object 1304 is currently selected for applying an effect. As shown in FIG. 15, the user may perform a gesture of pushing virtual tool 1404 into composite virtual object 1302. The second virtual object 1306 may be visually highlighted to represent second virtual object 1306 is currently selected for applying an effect. As shown in FIG. 15, the user may continue performing the gesture of pushing virtual tool 1404 into composite virtual object 1302. The third virtual object 1308 may be visually highlighted to represent third virtual object 1308 is currently selected for applying an effect. The user may perform a gesture of releasing virtual tool 1404 when the desired virtual object within composite virtual object 1302 is highlighted.

Returning to FIG. 1, in some implementations, application component 112 may be configured to, responsive to obtaining user input specifying one or more effects (e.g., participant permissions) to apply to virtual objects, specify one or more values of one or more parameters of the virtual objects to reflect the application of effects. By way of non-limiting illustration, responsive to specifying a first participant permission to be applied to a first virtual object, application component 112 may be configured to specify a value of a first permissions parameter of the first virtual object as a first value and/or other values. The first value of the first permissions parameter may reflects the application of the first participant permission. As presented herein, effects including participant permissions may be specified on a user basis, a group of users basis, and/or in other ways.

Returning to FIG. 1, presentation component 113 may be configured to effectuate presentation of one or more presentations. A presentation may be presented based on the scene information generated for individual scenes of the presentation. Presentation may be effectuated via HMD's (not shown in FIG. 1) of users viewing the presentation. Individual HMD's of individual users may include one or more components of system 100 presented herein such that the individual users may view the presentation of virtual content in the interactive space. The presentation may proceed in an automated, timed manner and/or may proceed in accordance with input from a user (e.g., a user presenting the presentation) to proceed from one scene to the next. For example, the presenting user may select individual virtual indicators to transition between slides as one or more viewing users look on. In some implementations, presentation component 113 may be configured to effectuate presentation of one or more presentations by instructing control component 108 to control one or more lights sources 122 to generate light forming images of scenes of the one or more presentations.

In some implementations, based on participant permissions specified for a given presentation and based on obtaining user input for interacting with one or more virtual objects present on one or more scenes, presentation component 113 may be configured to determine whether to instruct control component 108 to control one or more light sources 122 to modify one or more images forming the one or more objects to reflect the user input. By way of non-limiting illustration, based on a value of a first permissions parameter of a virtual object permitting user interactions of a first manner, and responsive to obtaining user input for interacting in the first manner with the virtual object during presentation of a scene, presentation component 113 may be configured to instruct control component 108 to control the light source to modify one or more images forming the virtual object in the scene to reflect the user input. By way of non-limiting illustration, based on a value of a first permissions parameter of a virtual object not permitting user interactions of a first manner, and responsive to obtaining user input for interacting in the first manner with the virtual object during presentation of a scene, presentation component 113 may be configured to instruct control component 108 to control the light source to not modify one or more images forming the virtual object in the scene. By way of non-limiting illustration, based on a value of a first permissions parameter of a virtual object not permitting user interactions of a first manner, and responsive to obtaining user input for interacting in the first manner with the virtual object during presentation of a scene, presentation component 113 may be configured to instruct control component 108 to control the light source to generate one or more images forming the virtual indicator indicating that interaction with the virtual object may not be permitted.

In FIG. 1, processor(s) 104, one or more sensors 120, one or more light sources 122, one or more optical elements 124, external resources 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more sensors 120, one or more light sources 122, one or more optical elements 124, external resources 126, and/or other components of system 100 may be operatively linked via some other communication media. For example, operative linking of components of system 100 may be carried out regardless of whether multiple users may be viewing/presenting a presentation in real-time in-person, remotely synced, and/or asynchronously.

In some implementations, users may share a SLAM ("simultaneous localization and mapping") map—or other map generated by computer vision technologies—of a room in which the presentation may be taking place, and given their respective positions in the SLAM map, view the presentation. Interactions or input with regard to virtual object in a virtual presentation area may be synced with the others during a real-time collaboration.

In some implementations, system 100 may support asynchronous or "offline" collaboration. For example, a set of components (e.g., an HMD and/or other components) utilized by one user may authenticate to system 100, download and render a virtual presentation area, manipulate virtual objects in the virtual presentation area to generate a presentation, and save the presentation to system 100. The user may then share, via an invitation, access to the saved presentation to one or more other users utilizing one or more other components (e.g., an HMD and/or other components) which may then access the saved presentation. A user accessing the saved presentation may initiate a real-time viewing and/or editing of the presentation once the saved presentation is activated and rendered for viewing by the user.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 114, and/or other components. The processor(s) 104 may include communication lines or ports to enable the exchange of information with a network, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, and/or 113. Processor(s) 104 may be configured to execute components 108, 110, 112, and/or 113 by software; hardware; firmware; some combination of software, hardware, and/or firmware; and/or other mechanisms for configuring processing capabilities on processor(s) 104.

It should be appreciated that although components 108, 110, 112, and/or 113 are illustrated in FIG. 1 as being co-located within a single processing unit, in implementations in which processor(s) 104 includes multiple processing units, one or more of components 108, 110, 112, and/or 113 may be located remotely from the other components. The description of the functionality provided by the different components 108, 110, 112, and/or 113 described above is for illustrative purposes and is not intended to be limiting, as any of components 108, 110, 112, and/or 113 may provide more or less functionality than is described. For example, one or more of components 108, 110, 112, and/or 113 may be eliminated, and some or all of its functionality may be provided by other ones of components 108, 110, 112, 113, and/or other components. As another example, processor(s) 104 may be configured to execute one or more additional components that may perform some or all of the functionality attributed to one of components 108, 110, 112, and/or 113.

Figure 2:
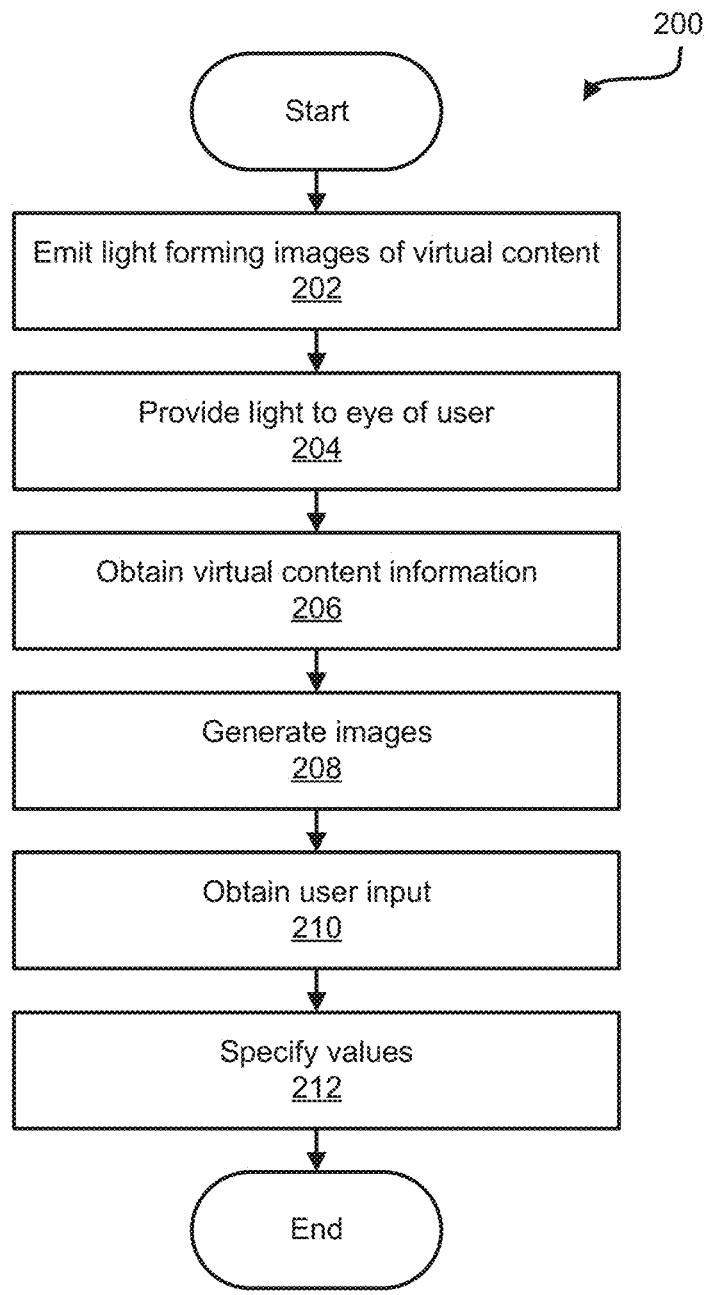
FIG. 2 illustrates a method to present virtual content in an interactive space, in accordance with one or more implementations.

FIG. 2 illustrates a method 200 to present virtual content in an interactive space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more sensors, one or more optical elements, and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

At an operation 202, light may be emitted to form image of virtual content. In some implementations, operation 202 may be performed using one or more light sources the same as or similar to one or more light sources 122 (shown in FIG. 1 and described herein).

At an operation 204, light emitted from one or more light sources may be provided to one or more eyes of a user. In some implementations, operation 204 may be performed using one or more optical elements the same as or similar to one or more optical elements 124 (shown in FIG. 1 and described herein).

At an operation 206, virtual content information and/or other information may be obtained. The virtual content information may define virtual content. The virtual content may include one or more of one or more virtual presentation areas, one or more virtual tools, one or more virtual objects, and/or other virtual content. A virtual presentation area may include one or more of a central portion, a boundary, one or more virtual indicators, and/or other virtual content. Individual virtual indicators may represent individual scenes of a presentation. Selection of an individual virtual indicator may cause scene information defining an individual scene represented by the individual virtual indicator to be defined. The scene information defining the individual scene may specify one or more of one or more virtual objects visible at or near the central portion of the virtual presentation area for the individual scene, individual poses of individual ones of the one or more virtual objects, and/or other information. The one or more virtual tools may be positioned at and/or near the boundary of a virtual presentation area. An individual virtual tool may represent an individual participant permission applicable to individual virtual objects present in an individual scene of the presentation. In some implementations, operation 206 may be performed by non-transitory electronic storage the same or similar to non-transitory electronic storage 114 (shown in FIG. 1 and described herein).

At an operation 208, one or more lights sources may be controlled to generate views of virtual content. The virtual content may be generated to be perceived within a three-dimensional light field. By way of non-limiting illustration, one or more light sources may be controlled to generate one or more of an image forming an instance of the virtual presentation area, an image forming an instance of a first virtual tool, and/or other images forming other virtual content. The first virtual tool may represent a first participant permission applicable to individual virtual objects. In some implementations, operation 208 may be performed by one or more physical processors executing a control component the same as or similar to control component 108 (shown in FIG. 1 and described herein).

At an operation 210, user input may be obtained. User input may facilitate generating a first presentation including a first scene, and/or other scenes. The user input may comprise one or more of selecting a first virtual indicator to define first scene information for the first scene, posing a first virtual object on the central portion of the instance of the virtual presentation area, specifying one or more participant permissions to be applied to the first virtual object, wherein specifying the first participant permission to be applied to the first virtual object may be facilitated by the first virtual tool, and/or other input. In some implementations, operation 210 may be performed by one or more physical processors executing an input component the same as or similar to input component 110 (shown in FIG. 1 and described herein).

At an operation 212, responsive to obtaining user input specifying one or more participant permissions to be applied to one or more virtual objects, one or more values of one or more permissions parameters of the virtual object may be specified. By way of non-limiting illustration, responsive to specifying the first participant permission to be applied to the first virtual object, a value of a first permissions parameter of the first virtual object may be specified as a first value. The first value of the first permissions parameter may reflect the application of the first participant permission. In some implementations, operation 212 may be performed by one or more physical processors executing an application component the same as or similar to application component 112 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementation, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to present virtual content in an interactive space, the system comprising:
   non-transitory electronic storage storing virtual content information, the virtual content information defining virtual content, the virtual content including: a virtual presentation area, the virtual presentation area providing a visual anchor for scenes of a presentation, the scenes being individually defined by scene information that specifies virtual objects visible in the individual scenes and poses of the virtual objects for the individual scenes; and
   virtual tools positioned to be viewable with the virtual presentation area, the individual virtual tools representing different participant permissions applicable to individual virtual objects present in an individual scene; and
   one or more physical processors configured by machine-readable instructions to: control a light source to generate images forming the virtual content to be perceived within a three-dimensional light field, the light source being controlled to: generate an image forming an instance of the virtual presentation area; and
   generate an image forming an instance of a first virtual tool, the first virtual tool representing a first participant permission;
   obtain first user input designating scene information defining a first presentation that includes a first scene, the first user input comprising:
   selection of a first virtual indicator that represents user input that defines first scene information for the first scene;
   a pose for a first virtual object within the first scene, the pose including location and orientation of the first virtual object with respect to the instance of the virtual presentation area; and
   selection of the first virtual tool for application to the first virtual object; and
   specification of a value of a first permissions parameter for the first participant permission that is applied to the first virtual object by the first virtual tool; and effectuate storage of the scene information for the first presentation to facilitate future display of the first presentation,
   wherein the first scene information specifies the first virtual object, the pose of the first virtual object, and the first value of the first permission parameter, and wherein the one or more physical processors are further configured by machine-readable instructions to:
   effectuate presentation of the first presentation including the first scene by controlling the light source to generate one or more images forming the first scene based on the first scene information, the first scene including the first virtual object;
   obtain second user input for interacting in a first manner with the first virtual object during presentation of the first scene; and
   based on the second user input and the first value of the first permissions parameter, determine whether to control the light source to modify one or more images forming the first virtual object in the first scene to reflect the second user input.

2. The system of claim 1, wherein the one or more physical processors are further configured by machine-readable instructions to:
   responsive to the first value of the first permissions parameter permitting user interactions of the first manner, control the light source to modify the one or more images forming the first virtual object in the first scene to reflect the second user input.

3. The system of claim 1, wherein the one or more physical processors are further configured by machine-readable instructions to:
   responsive to the first value of the first permissions parameter not permitting user interactions of the first manner, control the light source to indicate modification to the first virtual object is impermissible.

4. The system of claim 1, wherein:
   the second user input for interacting in the first manner includes a set of gesture-based inputs.

5. The system of claim 1, wherein specifying the value of the first permissions parameter further includes specifying a second user for which the first participant permission applies.

6. The system of claim 5, wherein specifying the value of the first permissions parameter further includes specifying a visibility of interactions of the second user with the first virtual object.

7. The system of claim 1, wherein first participant permission is related to one or more of changing a position, changing an orientation, changing a color, or changing a display mode of virtual objects.

8. The system of claim 1, further comprising:
the light source configured to emit light forming the images of the virtual content;
an optical element, the optical element being configured to provide the light emitted from the light source to an eye of the user to generate the perceived three-dimensional light field within the user's field-of-view; and
wherein the optical element is configured to provide the light emitted from the light source to the eye of the user by reflecting the light off of the optical element into the eye of the user.

9. The system of claim 1, further comprising:
the light source configured to emit light forming the images of the virtual content;
an optical element, the optical element being configured to provide the light emitted from the light source to an eye of the user to generate the perceived three-dimensional light field within the user's field-of-view; and
wherein the optical element is configured to provide the light emitted from the light source to the eye of the user by coupling the light into the optical element, propagating the light through the optical element, and directing the light out of the optical element to the eye of the user.

10. A method to present virtual content in an interactive space, the method being implemented in a system comprising a light source, an optical element, non-transitory electronic storage, and one or more physical processors, the method comprising:
obtaining virtual content information, the virtual content information defining virtual content, the virtual content including:
a virtual presentation area, the virtual presentation area providing a visual anchor for scenes of a presentation, the scenes being individually defined by scene information that specifies virtual objects visible in the individual scenes and poses of the virtual objects for the individual scenes; and
virtual tools positioned to be viewable with the virtual presentation area, the individual virtual tools representing different participant permissions applicable to individual virtual objects present in an individual scene; and
controlling a light source to generate images forming the virtual content to be perceived within a three-dimensional light field, the light source being controlled to:
generate an image forming an instance of the virtual presentation area; and
generate an image forming an instance of a first virtual tool, the first virtual tool representing a first participant permission;
obtaining first user input designating scene information defining a first presentation that includes a first scene, the first user input comprising:
selection of a first virtual indicator that represents user input that defines first scene information for the first scene;
a pose for a first virtual object within the first scene, the pose including location and orientation of the first virtual object with respect to the instance of the virtual presentation area;
selection of the first virtual tool for application to the first virtual object; and specification of a value of a first permissions parameter for the first participant permission that is applied to the first virtual object by the first virtual tool; and effectuating storage of the scene information for the first presentation to facilitate future display of the first presentation,
wherein the first scene information specifies the first virtual object, the pose of the first virtual object, and the first value of the first permission parameter, and wherein the method further comprises:
effectuating presentation of the first presentation including the first scene by controlling the light source to generate one or more images forming the first scene based on the first scene information, the first scene including the first virtual object;
obtaining second user input for interacting in a first manner with the first virtual object during presentation of the first scene; and
based on the second user input and the first value of the first permissions parameter, determining whether to control the light source to modify one or more images forming the first virtual object in the first scene to reflect the second user input.

11. The method of claim 10, further comprising:
responsive to the first value of the first permissions parameter permitting user interactions of the first manner, controlling the light source to modify the one or more images forming the first virtual object in the first scene to reflect the second user input.

12. The method of claim 10, further comprising:
responsive to the first value of the first permissions parameter not permitting user interactions of the first manner, controlling the light source to indicate modification to the first virtual object is impermissible.

13. The method of claim 10, wherein:
the second user input for interacting in the first manner includes a set of gesture-based inputs.

14. The method of claim 10, wherein specifying the value of the first permissions parameter further includes specifying a second user for which the first participant permission applies.

15. The method of claim 14, wherein specifying the first participant permission further includes specifying a visibility of interactions of the second user with the first virtual object.

16. The method of claim 10, wherein first participant permission is related to one or more of changing a position, changing an orientation, changing a color, or changing a display mode of virtual objects.

17. The method of claim 10, further comprising:
emitting, using the light source, light to form the images of the virtual content;
providing, using the optical element, the light emitted from the light source to an eye of the user to generate the perceived three-dimensional light field within the user's field-of-view; and
wherein providing the light comprises reflecting the light off of the optical element into the eye of the user.

18. The method of claim/1, further comprising:
emitting, using the light source, light forming the images of the virtual content;
providing, using the optical element, the light emitted from the light source to an eye of the user to generate the perceived three-dimensional light field within the user's field-of-view; and
wherein providing the light comprises coupling the light into the optical element, propagating the light through the optical element, and directing the light out of the optical element to the eye of the user.

* * * * *